United States Patent [19]

Raho et al.

[11] Patent Number: 5,142,790
[45] Date of Patent: Sep. 1, 1992

[54] MEASURING MACHINE PROVIDED WITH HAND GRIP MEANS FOR DISPLACEMENT OF A MEASUREMENT HEAD OF THE MACHINE ALONG THREE AXES

[75] Inventors: Guglielmo Raho, Chieri; Mauro Zona, Turin, both of Italy

[73] Assignee: D.E.A. Digital Electronic Automation SpA, Moncalieri, Italy

[21] Appl. No.: 519,285

[22] Filed: May 4, 1990

[30] Foreign Application Priority Data

May 8, 1989 [IT] Italy .................. 67332 A/89

[51] Int. Cl.⁵ ................................. G01B 5/03
[52] U.S. Cl. ..................................... 33/503; 33/1 M
[58] Field of Search ............... 33/503, 1 M, 556, 559, 33/572, 511, 512

[56] References Cited

U.S. PATENT DOCUMENTS

| | | | |
|---|---|---|---|
| 1,575,983 | 3/1926 | Fish | 33/503 |
| 2,807,093 | 9/1957 | Sanchez | 33/556 |
| 3,455,026 | 7/1969 | Brault | 33/1 M |
| 3,750,295 | 8/1973 | Nordmann et al. | 33/503 |
| 3,816,930 | 6/1974 | Edenholm | 33/503 |
| 4,228,595 | 10/1980 | Steinbach . | |
| 4,255,862 | 3/1981 | Nakamura . | |
| 4,466,195 | 8/1984 | Herzog | 33/503 |
| 4,503,614 | 3/1985 | Tuss | 33/803 |
| 4,766,674 | 8/1988 | Zanier et al. | 33/1 M |
| 4,790,078 | 12/1988 | Schneider | 33/503 |
| 4,947,557 | 8/1990 | Gapshis et al. | 33/503 |

FOREIGN PATENT DOCUMENTS

| | | |
|---|---|---|
| 849315 | 10/1957 | United Kingdom . |
| 998932 | 12/1961 | United Kingdom . |
| 979928 | 2/1963 | United Kingdom . |
| 1327658 | 6/1970 | United Kingdom . |

*Primary Examiner*—William A. Cuchlinski, Jr.
*Assistant Examiner*—C. W. Fulton
*Attorney, Agent, or Firm*—Gifford, Groh, Sprinkle, Patmore & Anderson

[57] ABSTRACT

A measuring machine provides a base provided with a measurement plane and first guide means defining a first longitudinal axis with respect to the measurement plane itself, a first portal-type carriage slidable along such first guide means and provided with second guide means defining a second axis extending transversely with respect to the measurement plane, a second carriage movable on such second guide means and provided with third guide means defining a third axis orthogonal to the measurement plane, a measurement head provided with a feeler carried by the second carriage and movable with respect to it along the axis by hand grip means fixed to the second carriage and provided with at least one actuating element for manual control of the translation of the measurement head and transmission means for coupling the actuation element to the measurement head.

17 Claims, 6 Drawing Sheets

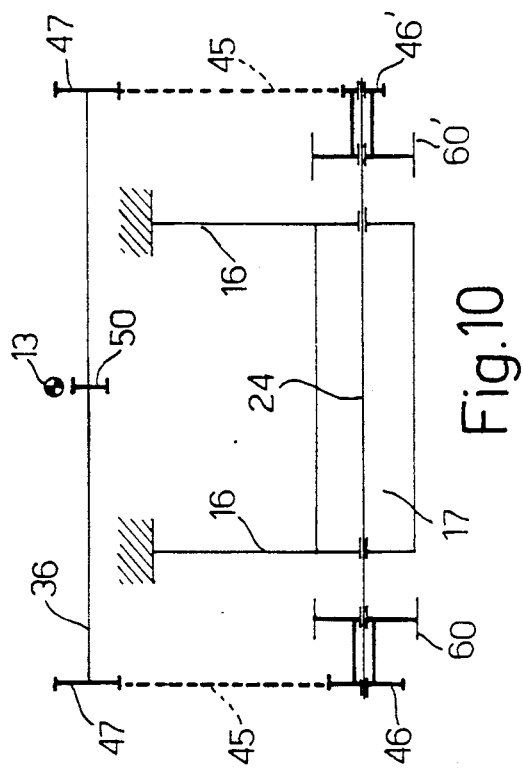
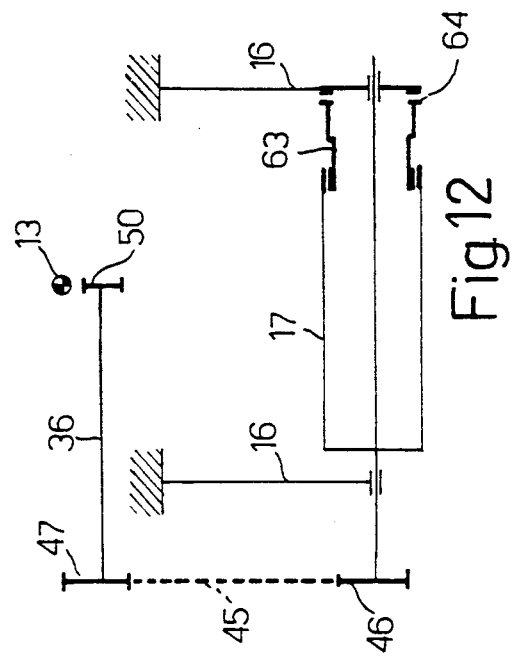
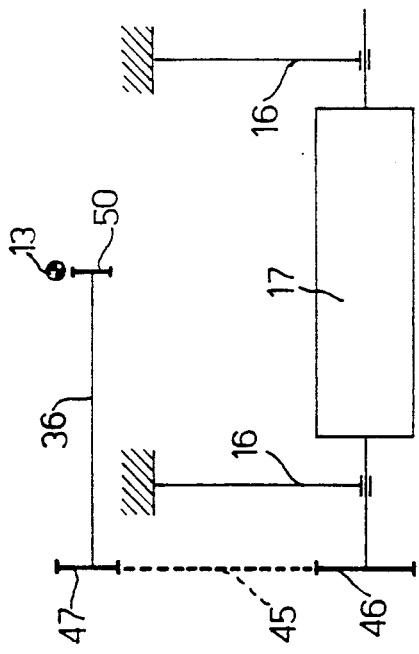

MEASURING MACHINE PROVIDED WITH HAND GRIP MEANS FOR DISPLACEMENT OF A MEASUREMENT HEAD OF THE MACHINE ALONG THREE AXES

BACKGROUND OF THE INVENTION

The present invention relates to a measuring machine provided with a feeler for detecting in motion the linear measurements of a body, and in particular to a measuring machine of the type comprising a base provided with a measurement plane and guide means defining a longitudinal first or X-axis with respect to the measurement plane, a first portal carriage displaceable along such guide means and provided with second guide means defining a second or Y-axis extending transversely with respect to the said measurement plane, a second carriage movable on such second guide means and provided with third guide means defining a third or Z-axis orthogonal to the measurement plane, and a measurement head carrying the feeler, carried by the said carriage and movable with respect to it along the Z-axis.

In machines of the said type the measurement is generally effected in motion by carrying the feeler into contact with the body to be detected; the feeler is connected to detection and processing means of conventional type, which record the coordinates of the point of impact.

The motion of the carriages and of the measurement head, at least in machines of small dimensions, is generally obtained by manually displacing the measurement head, and therefore indirectly the carriages, towards the body to be measured. It is evident that a manual actuation of the said type causes tensions and vibrations in the measurement head, and therefore introduces errors into the measurement. In machines of greater dimensions the displacement of the various parts is achieved manually, or by means of electric actuation, but in an independent manner for each of them.

This second solution evidently does not allow the simultaneous translation of the various movable parts of the machine along the respective axes and makes the measurement cycles long and complex.

SUMMARY OF THE INVENTION

The object of the present invention is the provision of a measuring machine which will be free from the disadvantages connected with known measuring machines discussed above.

The object is achieved with the present invention in that it relates to a measuring machine of the type comprising a base provided with a measurement plane and first guide means defining at least a first axis, at least one carriage slidable along the first guide means, and a measurement head provided with a feeler, carried by the carriage and movable with respect to it along its own axis of translation orthogonal to the first axis, characterized by the fact that the carriage includes handle means provided with at least one actuating element for manual control of the translation of the measurement head, and transmission means for coupling the said actuating element to the said measurement head.

BRIEF DESCRIPTION OF THE DRAWINGS

For a better understanding of the present invention various preferred embodiments are described below purely by way of non-limitative example and with reference to the attached drawings, in which:

FIG. 8 schematically illustrates, in plan view from above, a kinematic actuating mechanism of the machine of FIG. 1;

FIGS. 10, 11, 12, 13 schematically illustrate different embodiments of kinematic actuating mechanisms of a measuring machine according to the principles of the present invention;

DETAILED DESCRIPTION OF THE INVENTION

Figure 2:
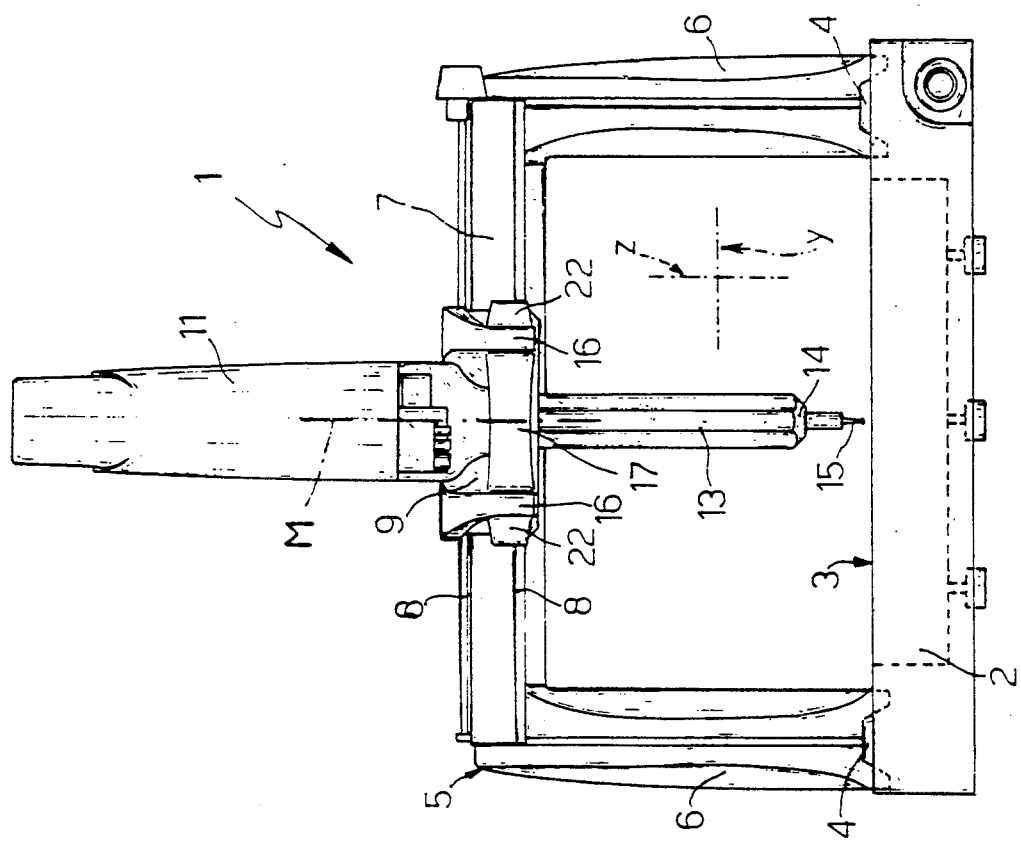
FIG. 2 is a front elevation of the machine of FIG. 1.
Figure 1:
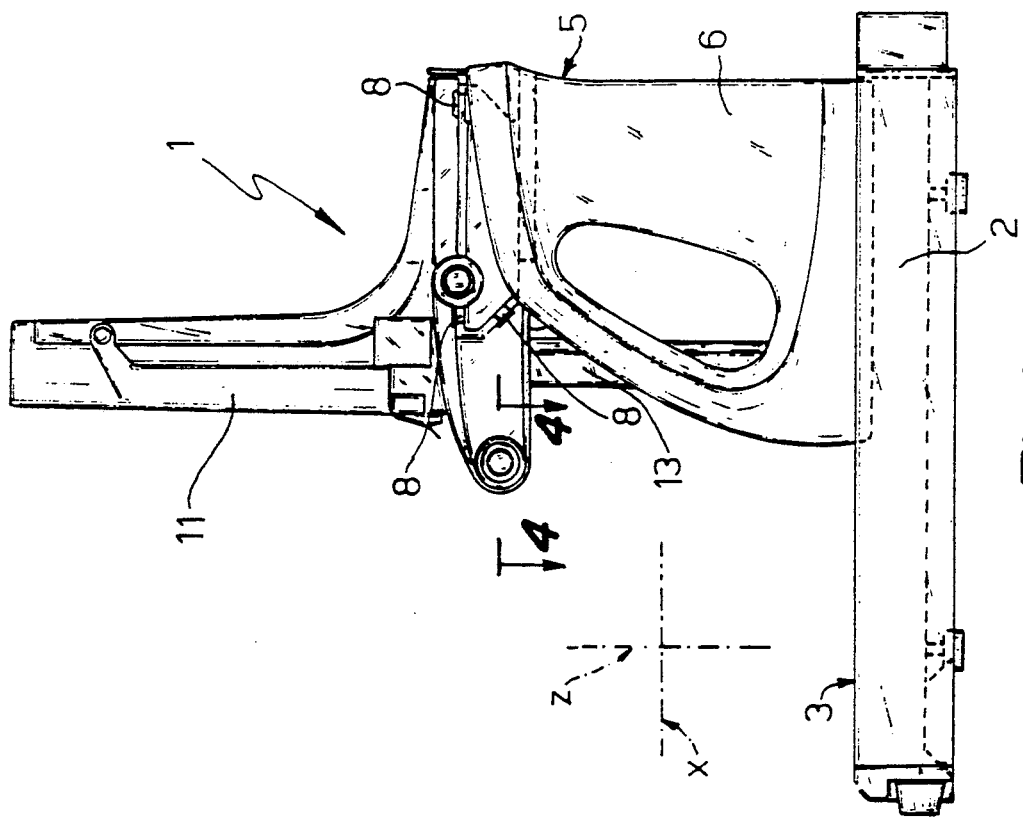
FIG. 1 is a side elevation of a first embodiment of a measuring machine according to the principles of the present invention.
Figure 3:
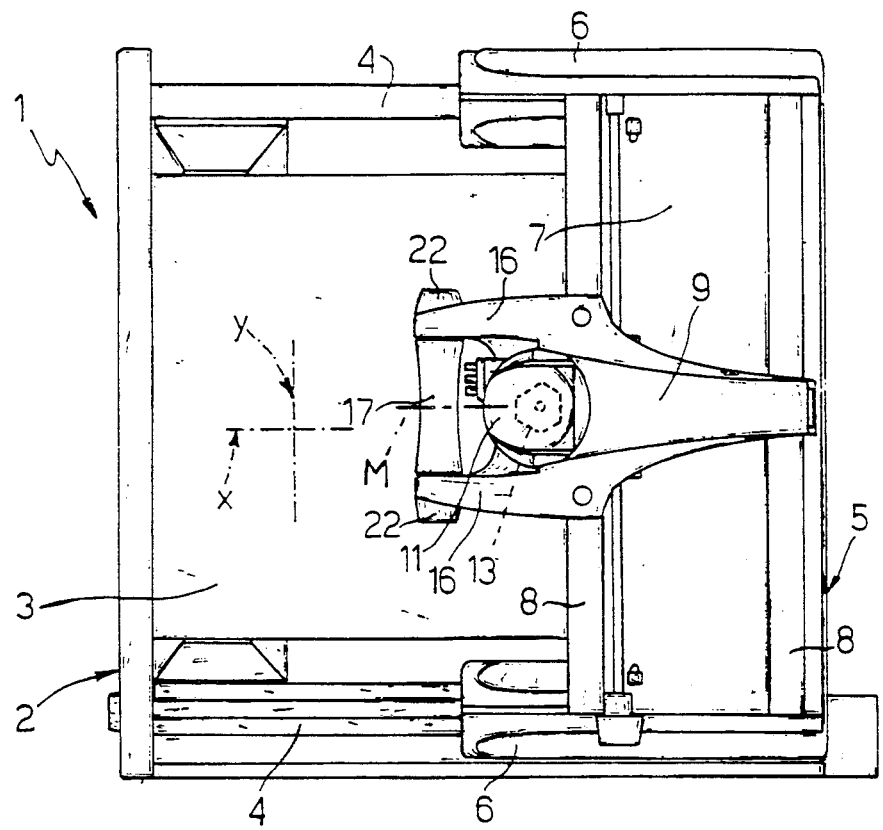
FIG. 3 is a plan view from above of the machine of FIG. 1.
Figure 6:
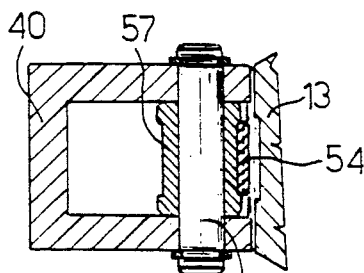
FIG. 6 is a section taken on the line 6—6 of FIG. 5.
Figure 7:
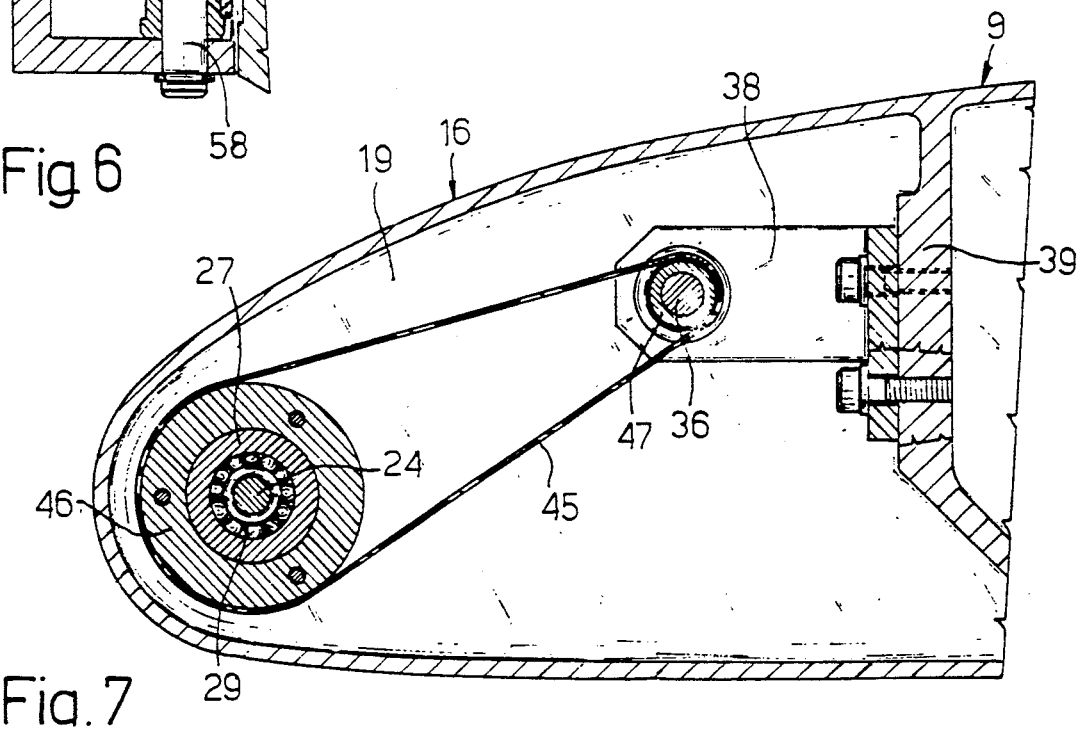
FIG. 7 is a section taken on the line 7—7 of FIG. 4.

With reference to Figures from 1 to 3, a portal type measuring machine for detecting the dimensions of bodies is generally indicated with the reference numeral 1.

The machine 1 comprises a base 2 defining on its upper face a measurement plane 3, and provided at the sides of the said measurement plane 3 with a pair of longitudinal guides 4 defining a first measurement axis.

The machine 1 further includes a first, portal-shape carriage 5 comprising a pair of side panels 6 slidable along the respective guides 4, and an upper crosspiece 7 provided with transverse guides 8 defining a second, or Y-axis orthogonal to the X-axis. On these guides 8 there is slidable a second carriage 9, defining in a region projecting forwardly of the crosspiece 7, a through cavity 10 in which is fixed the lower end of a substantially tubular metal tube 11.

Within the metal tube 11, which is downwardly open and provided internally with guide surfaces 12, there is slidably mounted a column-type measurement head 13 hereinafter for brevity called "column 13". This column 13, having a hollow polygonal section, is movable along a vertical or Z-axis with respect to the second carriage 9, and carries at its lower end 14 a feeler 15 which can cooperate, in use, with the workpiece to be measured. The feeler 15 is connected to a processing and recording unit of conventional type and therefore not illustrated, adapted to detect the spatial coordinates (X, Y, Z) of the points of contact between the measured body and the feeler 14.

Forwardly from the second carriage 9 extend two integrally formed lateral arms 16 between the ends of which is fixed a hand grip 17 having a horizontal axis.

Figure 4:
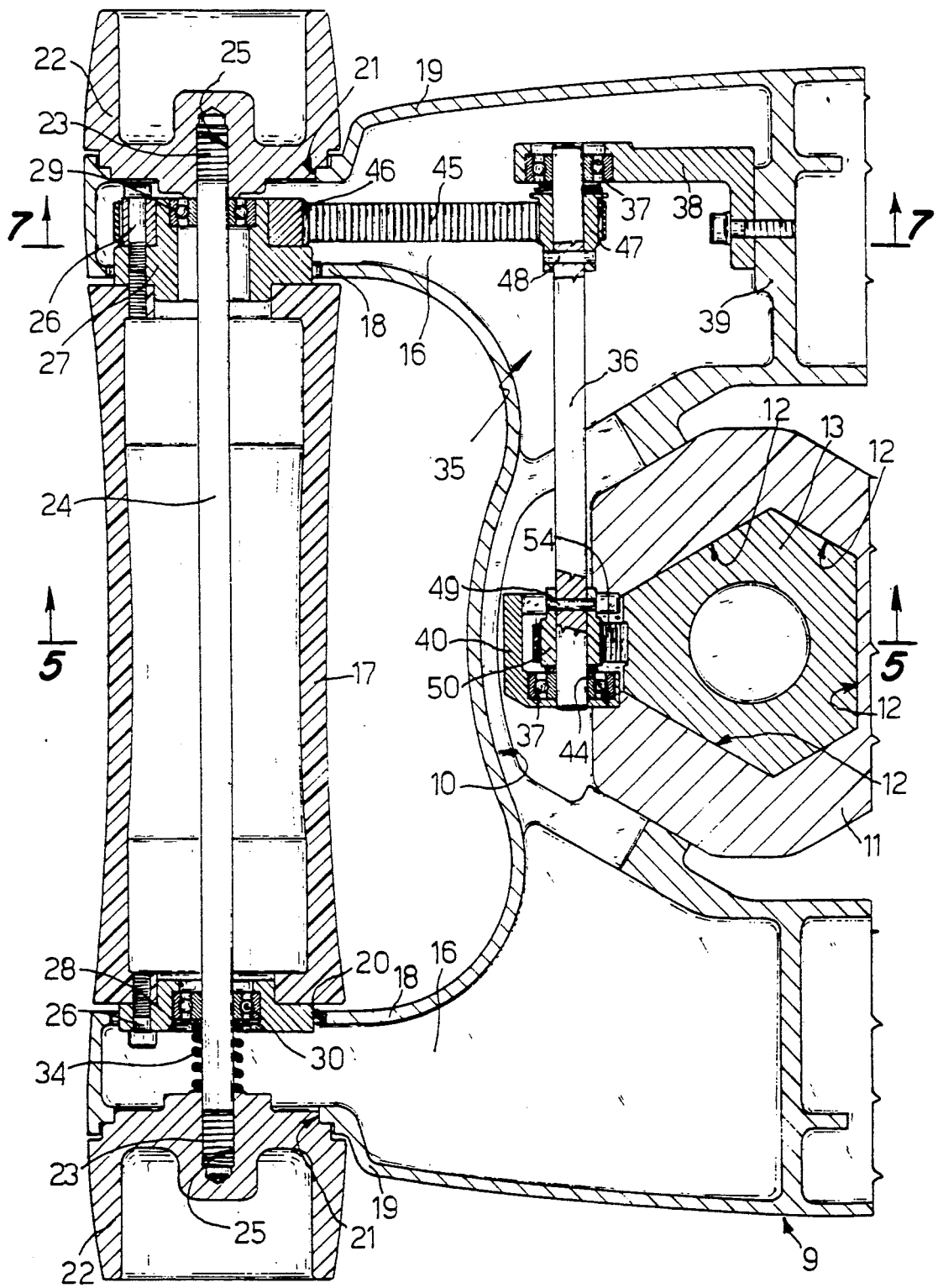
FIG. 4 is a section, on an enlarged scale, taken on the line 4—4 of FIG. 1.
Figure 5:
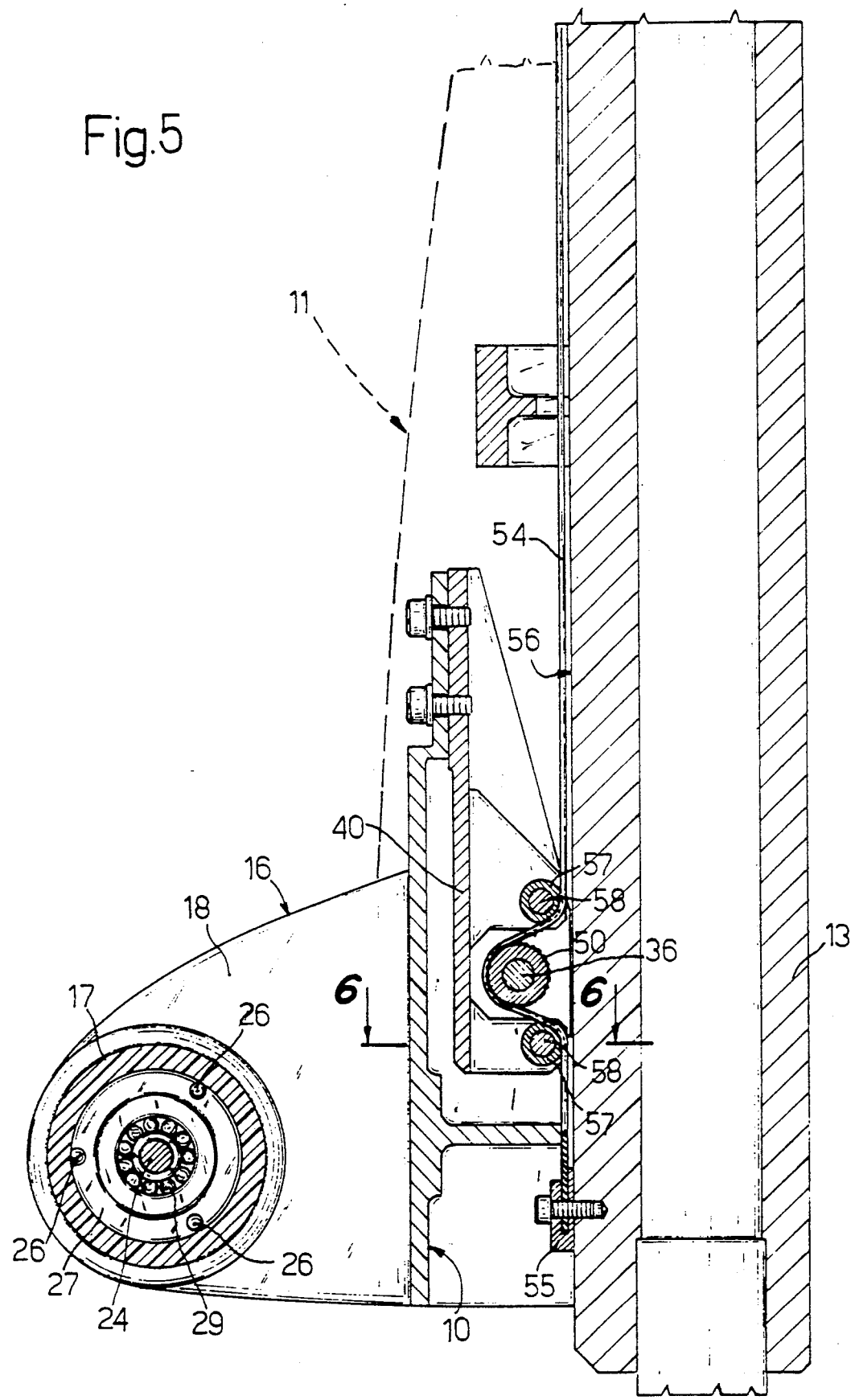
FIG. 5 is a section taken on the line 5—5 of FIG. 4.

With reference now to FIGS. 4 and 5, the arms 16 are hollow and define, on respective internal and external walls 18, 19, respective coaxial throughholes 20, 21.

In the holes 21 of the outer walls 19 are mounted, without radial play, two hollow substantially cup-shape supports 22, which are screwed on respective threaded end portions 23 of a transverse support spindle 24 of the hand grip 17, which engages respective axial threaded seats 25 thereof.

The hand grip 17 has a tubular form with a slightly concave longitudinal profile; at the opposite ends of this hand grip 17 there are fixed, by means of screws 26, two support bushes 27, 28 housed with radial play in the holes 20 of the internal walls 18 of the arms 16, and radially supported by ball bearings 29, 30 mounted on the spindle 24. A coil spring 34 which is precompressed between a support 22 and the inner ring of the bearing 30, maintains the other bearing 29 in axial abutment against the opposite support 22.

The arms 16 are disposed symmetrically with respect to a median vertical plane M of the carriage 9 and of the measurement head 13, parallel to the X-axis, and the hand grip 17 is symmetrical with respect to this plane. Within the carriage 9 there is housed a transmission device 35 connecting the hand grip 17 to the column 13 and acting to transform a rotation of the first into a vertical translation of the latter.

In particular, the device 35 comprises a spindle 36 having a horizontal axis parallel to the axis of the spindle 24, which is supported at its ends by a pair of ball bearings 37 housed respectively in a first L-shape bracket 38 fixed to an inner wall 39 of the carriage 9, and to a second C-shape bracket 40 fixed to the interior of the cavity 10 and partially housed in a frontal aperture 44 of the metal tube 11.

The handle 17 and the spindle 36 are angularly coupled together with spindle 24 being stationary by a toothed belt 45 which engages a drive pulley 46 mounted on the support bush 27 of the spindle 24 by means of the same screws 26 as fix it to the hand grip 17, and a driven pulley 47 fixed by a transverse pin 48 to one end of the spindle 36 close to the bracket 38.

On the opposite end of the spindle 36 a further pulley 50 is fitted by means of a pin 49, which pulley engages with a toothed belt 54 fixed to the column 13. In particular, the belt 54 is fixed vertically at its ends by respective terminals 55, only one of which is illustrated in FIG. 5, to a front face 56 of the column 13. Above and below the pulley 50 about which it turns the belt 54 engages respective idler pulleys 57 mounted rotatably o respective pins 58 fixed to the bracket 40 and parallel to the spindle 36, which maintain it tensioned and parallel to the face 56 of the column 13.

The function of the machine 1 is known per se as far as the measurement operations are concerned; in particular, the feeler 15 is carried into contact with the workpiece to be measured, and the said processing and recording unit detects the spatial coordinates (X, Y, Z) of the points of contact.

The displacement of the portal-type carriage 5 along the X-axis and of the carriage 9 along the Y-axis is obtained manually by gripping the hand grip 17 and displacing it in the desired direction. Displacement of the column 13 along the Z-axis is obtained by rotating the hand grip 17 about the spindle 24.

The drive pulley 46 fixed thereto also rotates with the hand grip 17, and therefore the spindle 36 to which the belt 45 transmits the movement by means of the pulley 47. The pulley 50, fixed to the spindle 36, rotates and transmits the motion to the belt 54, fixed as mentioned to the column 13, which therefore translates vertically along the Z-axis at a speed equal to the peripheral velocity of the primitive cylinder of the pulley 50.

With a single manual control there is therefore achieved simultaneously a displacement of the feeler 15 along the three axes X, Y, Z. Moreover, given the symmetry of the arms 16 and of the hand grip 17 with respect to the plane M, the manual actuating load, in particular in the X direction, is substantially constituted by a pure force, that is to say there is no couple induced on the carriage 9 about the axis Z which could alter the measurement.

Figure 9:
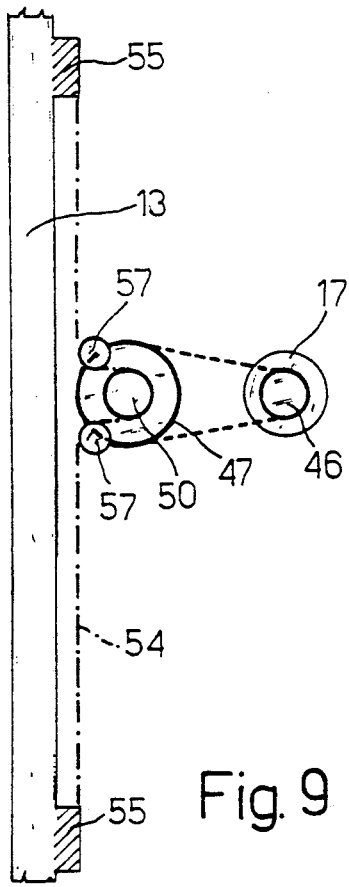
FIG. 9 schematically illustrates, in side elevation, the kinematic mechanism of FIG. 8.

FIGS. 8 and 9 schematically illustrate the described principle of operation, utilising for the various parts the same reference numerals utilised in the preceding description.

Figures from 10 to 16 schematically illustrate various other embodiments of the machine 1, and in particular of the transmission device 36, again utilizing for greater clarity the same reference numerals to indicate the same or corresponding parts as those already described.

In particular, in the embodiment illustrated in FIG. 10, the hand grip 17 is fixed to the arms 16, and the spindle 24 is rotatable, on which spindle are mounted two hand grips 60, 60' fixed to associated drive pulleys 46, 46' of different diameter. Each of the said pulleys 46, 46' is angularly coupled by means of a belt 45 to a respective pulley 47 of a return spindle 36 which transmits the drive to the column 13 in the manner described. Therefore, by actuating one or the other of the hand grips 60, 60' translation of the column 13 with a different speed is obtained.

The embodiment illustrated in FIG. 11 is entirely analogous to that described in detail and indicated in FIGS. 8, 9, with the single difference that a block brake 61 is provided on the spindle 36, controlled by a lever 62 for locking the column 13.

The embodiment of FIG. 12 is similar to that of FIG. 11, but in this case the locking of the translation of the column 13 can be effected directly on the hand grip 17. At one end of this hand grip 17 there is angularly coupled an axially slidable grooved sleeve 63 provided with a frontal clutch 64 adapted to cooperate with one of the arms 16 to lock the hand grip 17 itself.

Figure 13:
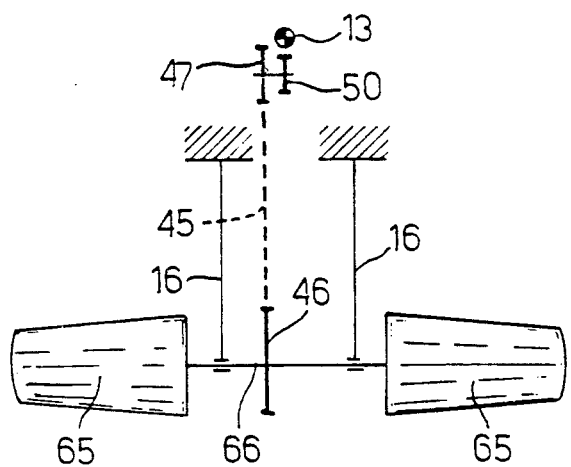

In FIG. 13 there is illustrated an embodiment in which the hand grip 17 is replaced by a pair of lateral knobs 65 angularly coupled to the opposite ends of a spindle 66 on which the drive pulley 46 is fitted. The transmission of the drive to the column 13 is similar to that previously described.

Figure 14:
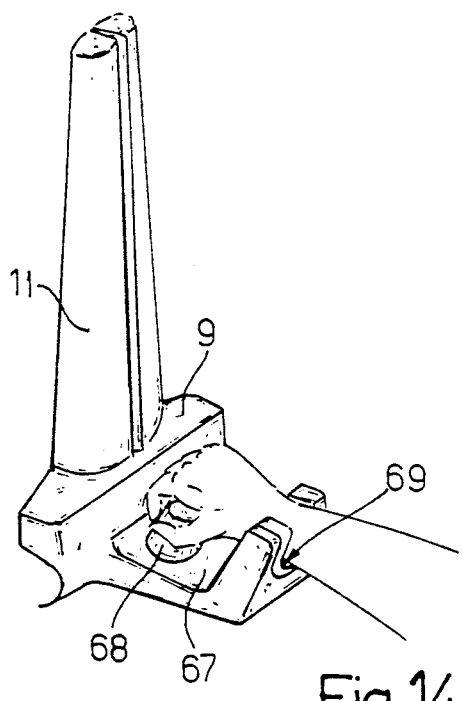
FIG. 14 schematically illustrates in perspective a detail of a further embodiment of a measuring machine according to the principles of the present invention.

In Figures from 14 to 16 there is, finally, described a further embodiment in which the carriage 9 has frontally, in place of the arms 16 and the hand grip 17, a bracket 67 carrying on its upper face a knob 68 having an inclined axis and contained in a vertical plane, and provided at its end with an anatomical housing 69 for the operator's wrist (FIG. 14).

Figure 15:
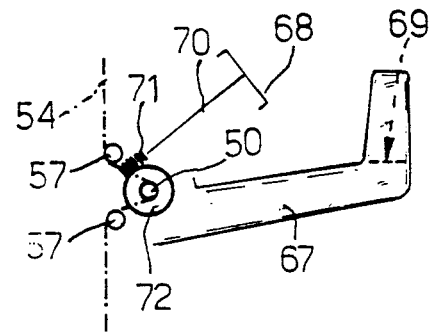
FIGS. 15 and 16 schematically illustrate, respectively in side elevation and in plan, two variants of embodiments of a kinematic actuating mechanism of the machine of FIG. 14.

In a first variant (FIG. 15) the knob 68 is fixed to a spindle 70 provided with a worm screw 71, which meshes with a toothed wheel 72 fitted to the same spindle as the pulley 50 which actuates the belt 54 fixed to the column 13.

Figure 16:
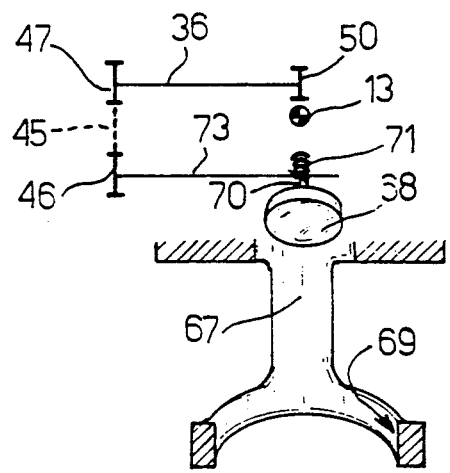

In a second variant (FIG. 16) the toothed wheel 72 is fitted to a spindle provided with a drive pulley 46, which gives motion to a return spindle 36 and therefore to the column 13 in the manner described.

From a study of the characteristics of the machine 1 formed according to the present invention the advantages which can be obtained are evident. In particular, the translation of the feeler along the three measurement axes is achieved in a simple manner by acting on a single manual actuation element, substantially without inducing deformations or oscillations in any of the parts in relative motion.

Finally, it is clear that the machine 1 can have modifications and variations introduced without by this departing from the protective ambit of the present invention. In particular, the means for transmission of the motion from the hand grip or knob to the column 13 can be varied: for example, in place of the toothed belts there could be employed smooth belts, chains, wound steel cables, rack and pinion mechanisms or friction wheels. Moreover, in the embodiment of FIG. 10, there could be provided more actuating knobs to obtain a greater number of different speeds of translation of the column 13.

Finally, the actuation of the column 13 can be effected by an electric motor, controlled by means of the hand grip or else by means of one or more push buttons disposed on the hand grip itself or in proximity thereto.

We claim:

1. A measuring machine comprising:
   a base provided with a measuring plane and first guide means defining a first axis;
   a first portal-type carriage movable along said first guide means of said base and provided with second guide means defining a second axis orthogonal to said first axis;
   a second carriage movable along said second guide means; and
   a measurement head carried by said second carriage and movable with respect to said second carriage along a third axis orthogonal to said first and second axes; said second carriage including a hand grip for manual displacement of said first and second carriages respectively along said first and second axes, said hand grip being symmetrical with respect to a vertical median plane of said second carriage parallel to said first axis and being provided with at least one actuating element for manual control of the translation of said measurement head, said hand grip further being rotatable to directly drive said actuating element through gears to move said measurement head along said third axis.

2. The machine according to claim 1, wherein said actuation element is rotatable about its own axis.

3. The machine according to claim 2, wherein said transmission means is of a mechanical type including a kinematic drive chain for conversion of a rotation of said actuation element into a translation of said measurement head.

4. The machine according to claim 3, wherein said transmission means includes a belt fixed at its ends to said measurement head, at least one traction pulley for displacing said belt, and angular coupling means disposed between said actuation element and said traction pulley for coupling the rotation of said actuation element to said traction pulley.

5. The machine according to claim 4, wherein said angular coupling means comprise at least one toothed belt which transmits the drive from a drive pulley coupled to said actuation element, to a return pulley connected to said traction pulley.

6. The machine according to claim 1 wherein said hand grip means include a pair of support arms extending frontally from said second carriage and at least one tubular hand grip attached to said support arms.

7. The machine according to claim 6, wherein said at least one tubular hand grip is rotatable about its own axis, said rotatable actuation element being constituted by said at least one tubular hand grip.

8. The machine according to claim 6, wherein said at least one tubular hand grip is fixed to said support arms, said actuation element comprises at least one knob coaxial with said hand grip.

9. The machine according to claim 8, comprising at least two knobs for controlling the translation of said measurement head at at least two different speeds.

10. The machine according to claim 1, wherein said hand grip means further comprises support means fixed to said second carriage and an anatomic seat for an operator's wrist formed on said support means, said actuating element including a knob rotatable on said support means.

11. The machine according to claim 1 further comprising locking means for locking said transmission means.

12. The machine according to claim 11, wherein said locking means include a block brake applied to a rotating element of said transmission means.

13. The machine according to claim 11, wherein said locking means comprises clutch means between said at least one tubular hand grip and at least one of a pair of integrally formed support arms extending from said second carriage.

14. The machine according to claim 1, wherein said transmission means include an electric motor for driving the translation of said measurement head.

15. The machine according to claim 14, wherein said electric motor is controlled by said hand grip means.

16. The machine according to claim 14, wherein said electric motor is controlled by at least one push button disposed in proximity to said hand grip means.

17. A measurement machine comprising a base provided with a measurement plane, first guide means defining a first axis, at least one carriage slidable along said first guide means, a measurement head provided with a feeler carried by at least one said carriage and movable with respect to it along it own axis of translation orthogonal to said first axis, said at least one carriage comprising hand grip means provided with at least one actuating element for manual control of the translation of said measurement head, said hand grip means further comprises support means fixed to said at least one carriage and an anatomic seat for an operator's wrist formed on said support means, said actuating element including a knob rotatable on said support means.

* * * * *